(12) United States Patent
Kivimaki

(10) Patent No.: US 7,174,295 B1
(45) Date of Patent: Feb. 6, 2007

(54) USER INTERFACE FOR TEXT TO SPEECH CONVERSION

(75) Inventor: Mika Kivimaki, Helsinki (FI)

(73) Assignee: Nokia Corporation, Espoo (FI)

( * ) Notice: Subject to any disclaimer, the term of this patent is extended or adjusted under 35 U.S.C. 154(b) by 357 days.

(21) Appl. No.: 09/656,225

(22) Filed: Sep. 6, 2000

(30) Foreign Application Priority Data

Sep. 6, 1999 (GB) ................................ 9921022.1

(51) Int. Cl.
G10L 13/08 (2006.01)

(52) U.S. Cl. ...................................... 704/260; 709/203

(58) Field of Classification Search ................ 704/258, 704/270, 275, 260, 235, 270.1; 345/157; 434/178; 709/203
See application file for complete search history.

(56) References Cited

U.S. PATENT DOCUMENTS

| 5,057,835 | A | * | 10/1991 | Factor | 340/995.27 |
| 5,065,345 | A | * | 11/1991 | Knowles et al. | 715/500.1 |
| 5,484,292 | A | * | 1/1996 | McTaggart | 434/317 |
| 5,732,216 | A | * | 3/1998 | Logan et al. | 709/203 |
| 5,850,629 | A | * | 12/1998 | Holm | 704/260 |
| 5,857,099 | A | * | 1/1999 | Mitchell | 704/235 |
| 5,875,428 | A | * | 2/1999 | Kurzweil et al. | 704/260 |
| 6,052,663 | A | * | 4/2000 | Kurzweil et al. | 704/260 |
| 6,115,482 | A | * | 9/2000 | Sears | 382/114 |
| 6,173,264 | B1 | * | 1/2001 | Kurzweil et al. | 704/260 |
| 6,199,042 | B1 | * | 3/2001 | Kurzweil | 704/260 |

FOREIGN PATENT DOCUMENTS

| GB | 2316526 | 2/1998 |
| WO | 9607999 | 3/1996 |
| WO | 9966493 | 12/1999 |

\* cited by examiner

*Primary Examiner*—Vijay Chawan
(74) *Attorney, Agent, or Firm*—Foley & Lardner, LLP

(57) ABSTRACT

An electronic device which includes a user interface having a display for displaying text and a speech synthesiser including a loudspeaker, arranged to convert an input, dependent upon a text, to an audio output representative of a person reading the text. The device may delay with respect to the audio output corresponding to a portion of text the display of the portion of text. The device may also or alternatively delay with respect to the audio output corresponding to a portion of text the highlighting of the portion of text within a displayed text.

39 Claims, 7 Drawing Sheets

| | WORD SIZE | TEXT GROUP ID | SELECTIVE HIGHLIGHT TYPE | TIME OF AUDIO OUTPUT |
|---|---|---|---|---|
| THANK-YOU | $S_1$ | 1 | | $t_1$ |
| FOR | $S_2$ | 1 | | $t_1$ |
| YOUR | $S_3$ | 1 | | $t_1$ |
| E-MAIL. | $S_4$ | 1 | DIFFICULT | $t_1$ |
| I | $S_5$ | 2 | | $t_3$ |
| LOOK | $S_6$ | 2 | | $t_3$ |
| FORWARD | $S_7$ | 2 | | $t_3$ |
| TO | $S_8$ | 2 | | $t_3$ |
| MEETING | $S_9$ | 2 | | $t_3$ |
| TOU | $S_{11}$ | 2 | UNEXPECTED | $t_3$ |
| THIS | $S_{12}$ | 2 | | $t_3$ |
| AFTERNOON | $S_{12}$ | 2 | | $t_3$ |
| IN | $S_{13}$ | 3 | | $t_5$ |
| LONDON, | $S_{14}$ | 3 | PROPER | $t_5$ |
| A | $S_{15}$ | 4 | | $t_7$ |
| BIENTOT. | $S_{16}$ | 4 | UNEXPECTED DIFFICULT | $t_7$ |

| WORD SIZE | TEXT GROUP ID | SELECTIVE HIGHLIGHT TYPE | TIME OF AUDIO OUTPUT |
|---|---|---|---|
| THANK-YOU | $S_1$ | 1 | | $t_1$ |
| FOR | $S_2$ | 1 | | $t_1$ |
| YOUR | $S_3$ | 1 | | $t_1$ |
| E-MAIL. | $S_4$ | 1 | DIFFICULT | $t_1$ |
| I | $S_5$ | 2 | | $t_3$ |
| LOOK | $S_6$ | 2 | | $t_3$ |
| FORWARD | $S_7$ | 2 | | $t_3$ |
| TO | $S_8$ | 2 | | $t_3$ |
| MEETING | $S_9$ | 2 | | $t_3$ |
| TOU | $S_{11}$ | 2 | UNEXPECTED | $t_3$ |
| THIS | $S_{12}$ | 2 | | $t_3$ |
| AFTERNOON | $S_{12}$ | 2 | | $t_3$ |
| IN | $S_{13}$ | 3 | | $t_5$ |
| LONDON, | $S_{14}$ | 3 | PROPER | $t_5$ |
| A | $S_{15}$ | 4 | | $t_7$ |
| BIENTOT. | $S_{16}$ | 4 | UNEXPECTED DIFFICULT | $t_7$ |

FIG. 7

USER INTERFACE FOR TEXT TO SPEECH CONVERSION

BACKGROUND OF THE INVENTION

The present invention relates to a user interface for providing a text output on a display and an audio output corresponding to the displayed text, The synthesis of human speech using electronic devices is a well developed and published technology and various commercial products are available. Typically speech synthesis programs convert written input to spoken output by automatically generating synthetic speech and speech synthesis is therefore often referred to a "Text-to-Speech" conversion (TTS).

There are several problems in speech synthesis which, as yet, have not been satisfactorily resolved and which impact on the comprehension of the synthetic speech by a user. One problem is that certain words and syllables are more difficult to pronounce than others. Another problem is that the pronunciation rules are language dependent and a French word in an English text will often be mispronounced by the speech synthesizer.

The above mentioned problems may be exacerbated in mobile electronic devices such as mobile telephones or pagers which may have limited processing resources It would be desirable to improve the level of comprehension a user has of the speech output from such speech synthesizer systems.

SUMMARY OF THE INVENTION

According to one aspect of the present invention there is provided an electronic device comprising a user interface having: a display for displaying text and speech synthesizer means including a loudspeaker, arranged to convert an input, dependent upon a text, to an audio output representative of a person reading the text; and control means, for controlling the display and for providing an input to the speech synthesizer means, arranged to control the display of a text, to provide an input corresponding to the displayed text to the speech synthesizer, and to highlight a portion or portions of the displayed text, wherein the highlighting of a text portion is delayed with respect to the audio output corresponding to the text portion.

Embodiments of the present invention therefore provide a display on which a user can check a word which has been mispronounced by the speech synthesizer. Moreover, the highlighting draws the user's eye to the relevant portion of displayed text at the correct time. The delay allows time for a user to register that a synthesized word was not understood and to look to the display.

The highlighting of text is particularly important when a user is performing another task while listening to the synthesized speech. The user is directed to the relevant portion of text with the minimum of distraction. The user does not need to scan unnecessary text to find the relevant portion of text. The user therefore expends less time and effort in comprehending the synthesized speech.

The control means may synchronize the highlighting with the conversion of text to audio output and/or may vary the highlighting with the conversion of text to audio output and/or may extend the highlighting selectively or unselectively through the displayed text with the conversion of text to audio output.

The extending of highlighting through a text portion may lag the conversion of the text portion to audio output by the delay. The highlighting may extend discontinuously by portions of text corresponding to a word or words. Highlighting of a text portion may be for a limited duration.

The highlighting may therefore isolate a portion or portions of text from a body of text, the isolation of text lagging the conversion of the text to audio output by the delay and the isolation being maintained for the limited duration.

The dimension of the highlighted portion may be variable or fixed. The dimensions of the highlighted portion may be a constant number of words, characters or syllables long.

The display may display the full sentence of text being converted. The display may display the previous predetermined plurality of words that have been converted.

The device may additionally comprise a dictionary, wherein the control means highlights words that are not in the dictionary. This highlighting may be different to the previously referred to highlighting.

The control means may be arranged to identify proper nouns in the text, and highlight them. This highlighting may be different to the previously referred to highlighting.

The synthesizer means may provide signals to the control means to effect the highlighting of specific words. This highlighting may be different to the previously referred to highlighting.

The highlighting may be any way of visually differentiating the highlighted text from the not highlighted text. Contrast variation of the text and/or display background, color variation of the text and/or display background; reformatting of the text including underscoring, using bold font, italic font or capitalization and changing font size or type; and enclosing the text in geometric shapes may in any combination be used to highlight text.

The delay may correspond to a fixed number of converted words or syllables. The delay may correspond to a fixed time. The delay is preferably greater than 0.1 seconds. The delay may be less than 3 seconds.

The electronic device may be portable and is preferably handheld.

The electronic device may be a radio communications device such as mobile radio telephone. The electronic device may be a document reader such as a Web browser, a Text-TV, a fax, a document browser for reading books, emails or other documents.

According to another aspect of the present invention there is provided a method for displaying text and providing speech synthesis of the text comprising the steps of: displaying the text; converting a text portion to audio output; determining that the text portion should be highlighted; delaying; and then highlighting the text portion. The display of a text may be already displayed when the speech corresponding to the text is synthesized, it may be simultaneous with the synthesis of that speech or it may be delayed with respect to the synthesis of that speech.

According to another, different, aspect of the present invention there is provided an electronic device comprising: a user interface having: a display for displaying text and speech synthesizer means including a loudspeaker, arranged to convert an input, dependent upon a text, to an audio output representative of a person reading the text; and control means, for controlling the display and for providing an input to the speech synthesizer means, arranged to control the display of a text, to provide an input corresponding to the displayed text to the speech synthesiser, and to delay the display of a text portion with respect to the audio output corresponding to the text portion. This delay is preferably greater than 0.1 seconds. There is also provided a method for displaying text and providing speech synthesis of the text comprising the steps of: converting a text portion to audio output; delaying; and then displaying the text.

BRIEF DESCRIPTION OF THE DRAWINGS

For a better understanding of the present invention and how it may be brought into effect reference will now be made by way of example only to the accompanying Figures in which:

FIG. 7 illustrates an example database for controlling delays.

DETAILED DESCRIPTION OF THE DRAWINGS

Figure 1:
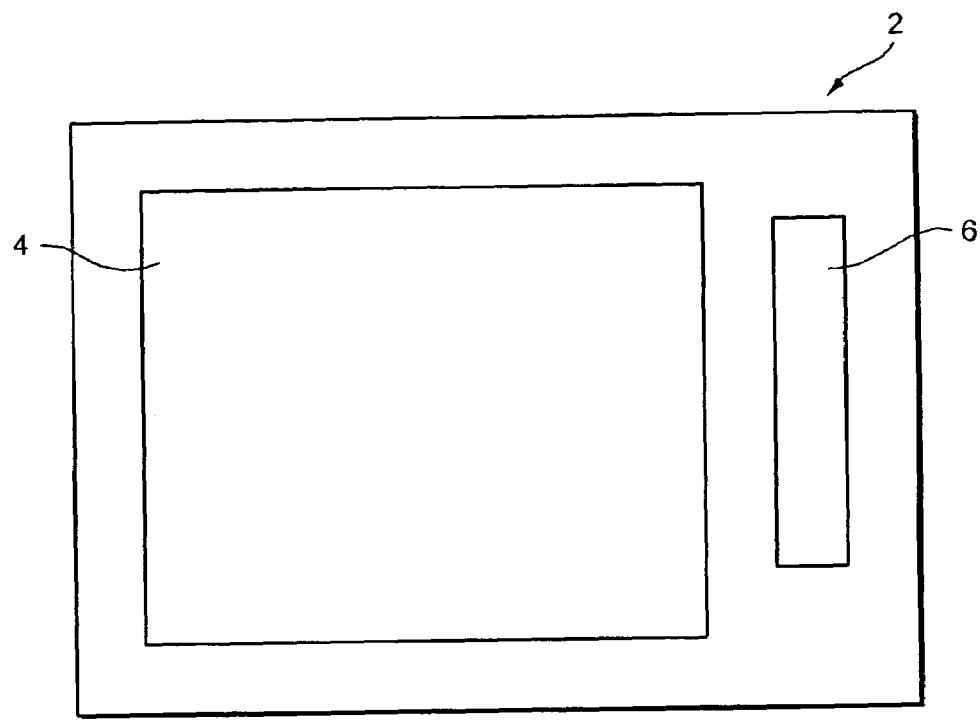
FIG. 1 illustrates an electronic device with a user interface having a loudspeaker and display

FIG. 1 illustrates an electronic device 2. The electronic device communicates to a user through its user interface which includes a display 4 and a loudspeaker 6. The device broadcasts synthesized speech to a user through the speaker 6 and at the same time displays text, from which the speech is derived, on the display. A user who does not understand the broadcast speech can improve their comprehension by reading the display. Portions of the display are highlightable to draw the users attention to those portions. Highlighting of text only occurs after the loudspeaker has broadcast the synthesized speech corresponding to the text. The electronic device may be any device which requires an audio-visual interface. It may be a personal digital assistant (PDA), a radio communications device such as mobile radio telephone e.g. a car-phone or hand-held phone, a computer system, a document reader such as a Web browser, a Text-TV, a fax, a document browser for reading books, emails or other documents or the like.

Although the display 4 and loudspeaker 6 in FIG. 1 are shown as being integrated in a single unit they may be separate.

Figure 2:
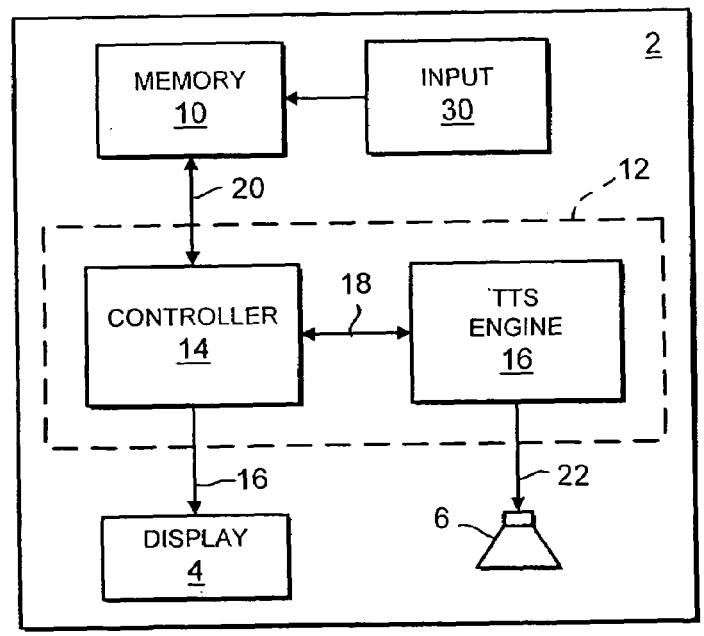
FIG. 2 is a schematic illustration of the components of the electronic device illustrated in FIG. 1

FIG. 2 is a schematic illustration of the electronic device 2. The device 2 in addition to having the display 4 and the loudspeaker 6 has a processor 12 for driving the display and the loudspeaker and for accessing a memory 10. The memory 10 stores text data supplied via an input 30. The processor 12 is illustrated as two functional blocks—a controller 14 and a text-to-speech engine 16. The controller 14 and text-to-speech engine 16 may be implemented as software running on the processor 12.

The text-to-speech engine 16 drives the loudspeaker 6. It receives a text input 18 from the controller and converts the text input to a synthetic speech output 22 which is transduced by the speaker 6 to sound waves. The speech output may be one word at a time, one phrase at a time or one sentence at a time.

The controller 14 reads the memory 20 and controls the display 4 and the text-to-speech engine 16. The controller having read text data from the memory provides it as an input 18 to the text-to-speech engine 16 and controls the display to display the text data using control signals 16. The displayed text corresponds to the text converted by the text-to-speech engine 16.

The memory 10 stores text data which is read by the controller 14. The controller 14 uses the text data to produce the input 18 to the text-to-speech engine 16 and the control signals 16 to the display. Text data is stored in the memory 10 by the input device 30. The input device in this example includes a radio transceiver for receiving text data in the form of SMS messages or emails.

The controller also controls the display to highlight text using the control signals 16. Highlighting of text includes anything which visually differentiates a portion of text from the remaining body of text on the display 4. Contrast variation of the text and/or display background, color variation of the text and/or display background, reformatting of the text including underscoring, using bold font, italic font or capitalization and changing font size or type and enclosing the text in geometric shapes may in any combination be used to highlight text.

The highlighting of the text is synchronized to the conversion of the text to audio output.

As each portion of the text is converted to audio output the controller determines if that text portion should be highlighted, and if it should be highlighted, it delays, then controls the highlighting of the text portion. A portion of text may be a character, a syllable, a word, a phrase, a sentence or sentences.

The delay is preferably of the order of a second or seconds but may be varied. It is greater than 0.1 second and less than 3 seconds. In particular, the delay may be related to the speed of the text-to-speech processor, the delay increasing as the speed decreases and visa-versa, The controller 14 may be selective or unselective in the highlighting of text. Unselective highlighting is the highlighting of each portion of text.

The highlighted portion of text may have a fixed length or a variable length. A portion of text, once highlighted remains temporarily highlighted until unhighlighted by the controller 14. Typically, this will occur after a predetermined time. When the highlighting of text is unselective it may occur when the highlighting has extended beyond the portion to be un-highlighted by a predetermined amount. When the highlighting of text is selective it may occur when the controller determines if a text portion, ahead of the portion to be unhighlighted by a predetermined amount, should be highlighted.

Figure 3:
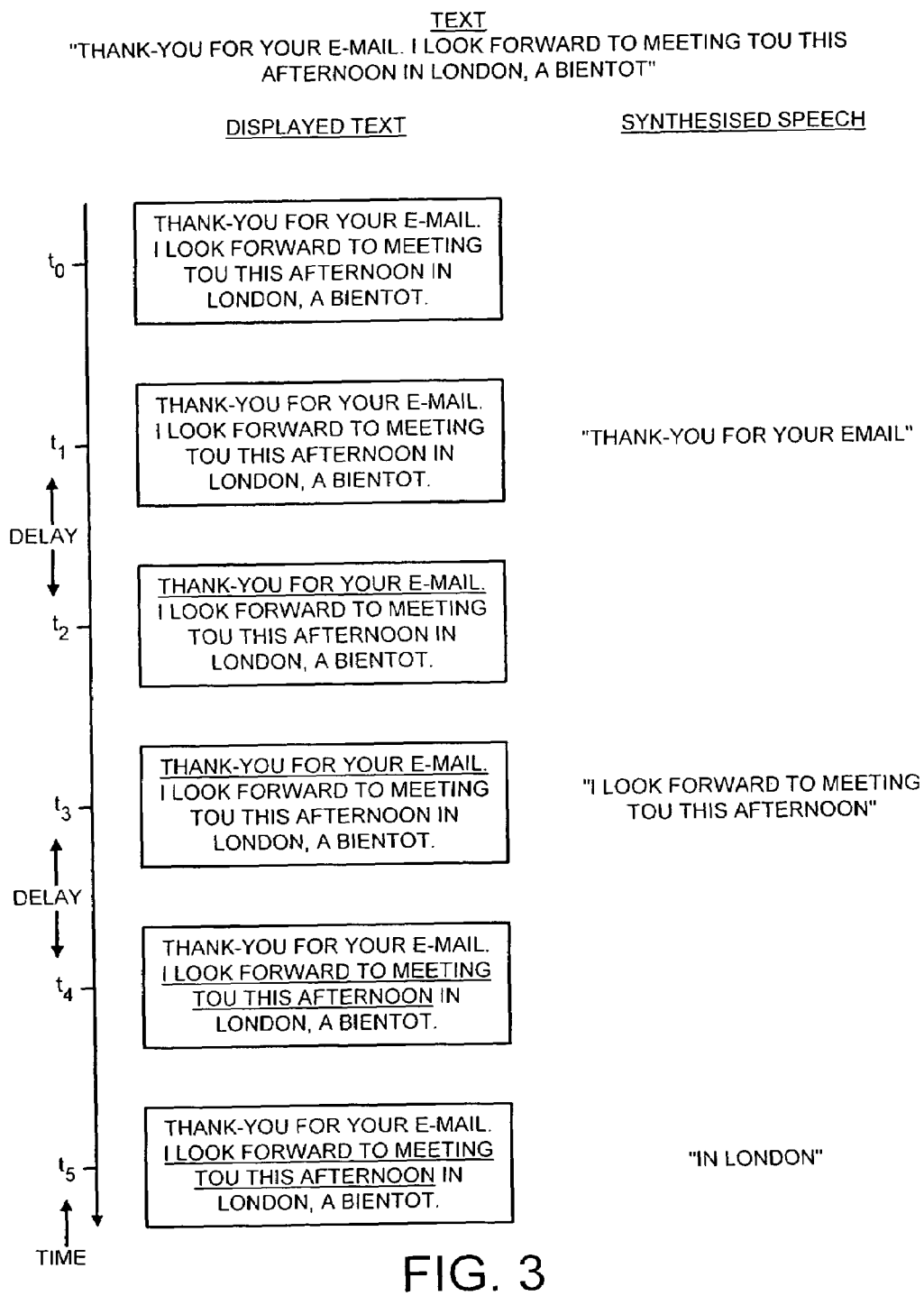
FIG. 3 illustrates the unselective highlighting of portions of a body of text.
Figure 3:
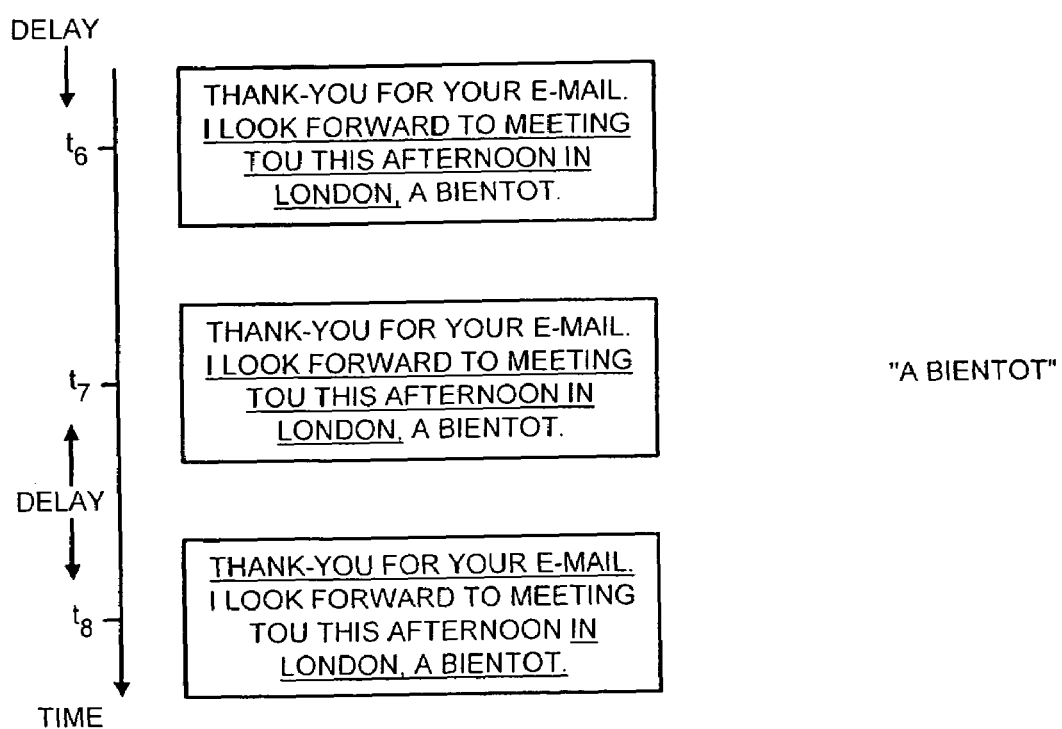
Figure 4:
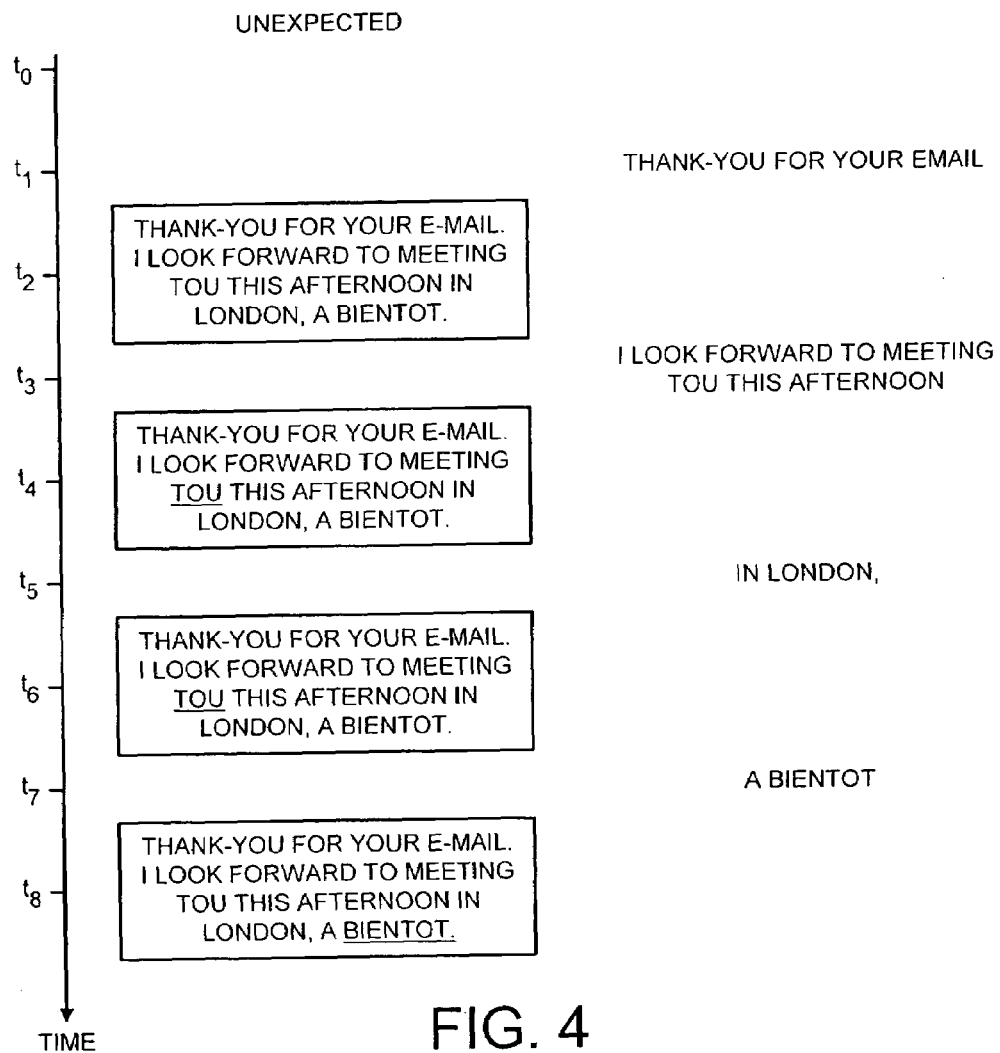
FIG. 4 illustrates the selective highlighting of portions of a body of text which are not in a dictionary.
Figure 5:
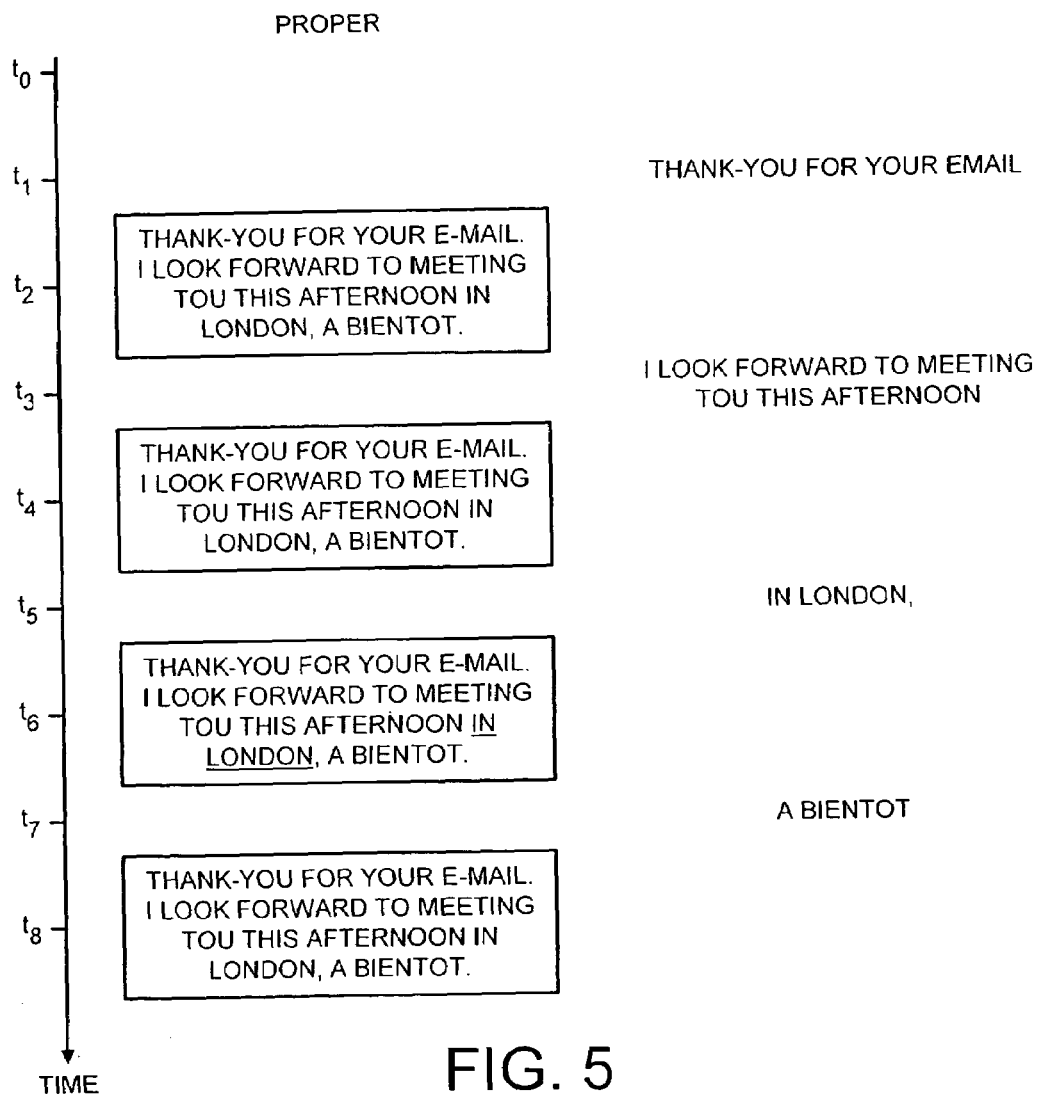
FIG. 5 illustrates the selective highlighting of portions of a body of text which are proper nouns.
Figure 6:
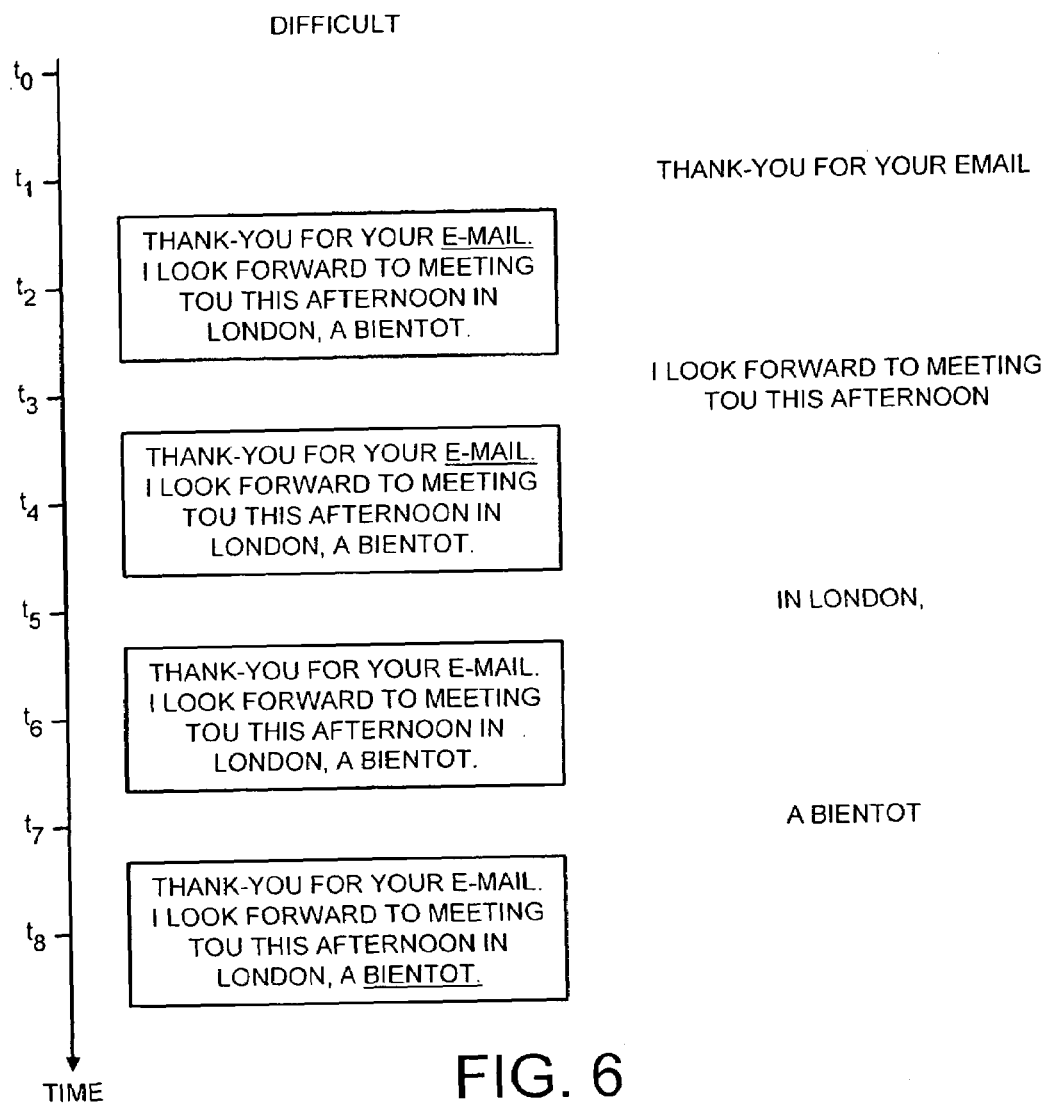
FIG. 6 illustrates the selective highlighting of portions of a body of text which are identified as difficult to convert accurately by the text-to-speech synthesiser.

In FIG. 3, there is illustrated an example of unselective highlighting. In FIGS. 4, 5 and 6 are illustrated different examples of selective highlighting. In each of these examples, the text stored in the memory 10 and read by the controller 14 is "Thank-you for your email. I look forward to meeting tou [sic] this afternoon in London, a bientot." To the left of the Figure is illustrated the display 16, controlled by controller 14, on which the text is shown. To the right the audio output of the loudspeaker 6 is illustrated. The visual output to the left and the audio output to the right evolve as the figure is descended. The time arrow to the left of the Figure marks the evolution.

The operation of the controller 14 will now be described in more detail. The controller accesses a text from the memory 10. It parses the text for selective highlighting purposes and for unselective highlighting and text to speech conversion. The parsing for selective highlighting purposes involves the identification of individual words by recognizing space characters within the text. The parsing for text to speech synthesis involves the separation of the text into separate text groups each of which includes one or several words. The word groups are sent one at a time to the TTS engine 16.

If the controller is performing selective highlighting it analyzes each of the words identified in the text. It can separately identify and indicate whether the word is unusual or foreign, whether the word is a proper name or whether the TTS engine is likely to mispronounce the word. The controller has a dictionary for the language being used which may contain words of common usage. A comparison of the word with the dictionary and its absence from the dictionary indicate that the word is "unexpected" and it can be selectively highlighted to indicate this. The controller may identify proper names in the English and French languages for example by recognizing capital font for letters which start a word but which do not follow a full stop (period). The controller can then identify the word for selective highlighting to indicate that the word is "proper". The controller may have a lexicon for the TTS which identifies words or letter groupings within words which may be incorrectly converted by the TTS engine or receive feed back from the TTS engine 16 which identifies a word group which is or is likely to be incorrectly converted by the TTS engine. The controller can then identify the word or the word or words in the group for selective highlighting to indicate that the word or group of words is "difficult".

The controller maintains a database to enable control of the delay in highlighting and/or text display. An example database is illustrated in FIG. 7. For the purposes of the example the phrase "Thank-you for your email. I look forward to meeting tou this afternoon in London, a bientot." has been parsed. The data base 30 has an entry for each of the 17 words in the phrase. Each entry has four fields. The first field 32 records the number of characters in a particular word entry. The second field 34 records which text group the word entry belongs to by storing a text group id which is different for each text group. The third field 36 records whether selective highlighting is required for the word and whether the word should be identified as "difficult", "unexpected" or "proper". The fourth field 38 records when the time or the expected time when the TTS engine 16 produces an audio output for the text group of which the entry is part.

After parsing the text input the entries for the first 32, second 34 and third 36 fields can be recorded for each entry. The input to the fourth field may be input predictively or responsively. For responsive input, when the controller sends a text group to the TTS engine it also sends the text group ID. The TTS engine stores the received text group IDs in the order in which they are received in a FIFO 16. When a text portion has been converted to speech it pops the FIFO to returns return the text group ID identifying the text group which has just been converted as signal 18 to the controller. When the controller receives this ID it records the time from its internal clock in the fourth field against those entries which have the same text group ID in their second field as the returned text group ID. For predictive input, an approximation is used for the time taken on average to convert a word (or character) to speech from when it is sent to the TTS engine. This is a parameter of the TTS engine 16. From the database 30, the number of words (and characters) including punctuation in a text group can be calculated and an estimate of the time at which the text group will be converted to speech deduced. The expected time of conversion for each text group is deduced. For each text group the appropriate time is recorded the fourth field for each entry which identifies that text group in its second field.

Referring to FIG. 7 there are four discrete text groups having text group IDs 1, 2, 3 and 4. Group 1 includes the words/characters "Thank-you for your email.". Group 2 includes the words/characters "I look forward to meeting tou this afternoon'. Group 3 includes the words/characters "in London,". Group 4 includes the words/characters "a bientot.". The text groups 1, 2, 3 and 4 are respectively converted to speech at times t1, t3, t5 and t7.

When the controller sends a text group to the TTS engine 16 it controls the display to display that text group. It may in certain circumstances be desirable to delay the display of the text so that it is not displayed in advance of the text being highlighted. This delay in displaying the text, if used, should be greater than 0.1 seconds but less than three seconds.

At a time $t2=t1+T$, where T is a predetermined delay, the controller accesses the database and controls the display to highlight the characters comprising the text group 1 if unselective highlighting is activated. If selective highlighting of "difficult" words is activated, then at time t2, the controller accesses the database and controls the display to selectively highlight the word "email".

At a time $t4=t3+T$, where T is a predetermined delay, the controller controls the display to highlight the characters comprising the text group 2 if unselective highlighting is activated. If selective highlighting of "unexpected" words is activated, then at time t4 the controller accesses the database and controls the display to selectively highlight the word "tou".

At a time $t6=t5+T$, where T is a predetermined delay, the controller accesses the database and controls the display to highlight the characters comprising the text group 3 if unselective highlighting is activated. If selective highlighting of "proper" words is activated, then at time t6 the controller accesses the database and controls the display to selectively highlight the word "London".

At a time $t8=t7+T$, where T is a predetermined delay the controller accesses the database and controls the display to highlight the characters comprising the text group 4 if unselective highlighting is activated. If selective highlighting of "unexpected" words is activated, then at time t8 the controller accesses the database and controls the display to selectively highlight the word "bientot". If selective highlighting of 'difficult" words is activated, then at time t8 the controller accesses the database and controls the display to selectively highlight the word "bientot".

The delay T can be adjusted and varied by the user to achieve their preferred delay. The delay T may be varied in dependence on the number of words and characters in a text group. In particular, the predetermined delay may be decreased as the text group size increases:

The removal of highlighting from a word or text group may be effected in a number of different ways. For example in unselective highlighting, highlighting may not be removed until the whole sentence in which the text group appears has been highlighted for at least a certain time. Alternatively highlighting may be removed from a text portion after it has been highlighted for a certain time. Another alternative is to have one or a certain number of contiguous text groups highlighted at any one time where the highlighting of a new text group results in the removal of highlighting from an old text group and the progression of the highlighting window through the text. For selective highlighting the word may remain highlighted until the adjacent text has its highlighting removed or would have done so if it had been highlighted or it may be highlighted for a certain time.

According to the first example (of unselective highlighting), illustrated in FIG. 3, as each portion of the text is converted to audio output the controller determines by default that the text portion should be highlighted, it delays, then controls the highlighting of the text portion. The highlighting is temporary. The highlighting extends at a leading edge through the displayed text one word or several words at a time and contracts at a trailing edge one word or several words at a time.

At time t0, the controller 14 places the text onto the display 4 and provides the text to the text-to-speech engine 16. At time t1, a portion of text, in this case the sentence "Thank-you for your email." is converted to audio output. The displayed text is unaffected.

After a delay, at time t2, the controller 14 highlights the portion of text "Thank-you for your email." in the body of displayed text.

At time t3, another portion of text, in this case the phrase "I look forward to meeting tou this afternoon" is converted to audio output. The displayed text and highlighting is unaffected.

After a delay, at time t4, the controller 14 highlights the portion of text "I look forward to meeting tou this afternoon" in the body of displayed text. By the time t4, the controller has un-highlighted the sentence "Thank-you for your email."

At time t5, another portion of text, in this case the phrase "in London" is converted to audio output. The displayed text and highlighting is unaffected.

After a delay, at time t6, the controller 14 highlights the portion of text "in London" in the body of displayed text. At the time t6, the controller is still highlighted the phrase "I look forward to meeting tou this afternoon".

At time t7, another portion of text, in this case the phrase "a bientot" is converted to audio output, the displayed text and highlighting is unaffected.

After a delay, at time t8, the controller 14 highlights the portion of text "a bientot" in the body of displayed text. By the time t8, the controller has un-highlighted the phrase "I look forward to meeting tou this afternoon".

According to a second example (of selective highlighting), illustrated in FIG. 4, highlighting may be selectively applied to the displayed text. In this example, text is highlighted if it is not in a dictionary.

The controller determines if a word in a text group should be highlighted, if it should be highlighted, it waits after the conversion of the text group to speech, then controls the highlighting of the text portion.

At time t0, the controller 14 places the text onto the display 4. A portion of text, in this case the sentence "Thank-you for your email." is sent to the TTS engine for conversion to audio output and converted at time t1. The controller determines if that text portion should be highlighted in the displayed text. It checks each word in the sentence against the words stored in a dictionary. Each word is recognized and no highlighting is required. The displayed text is unaffected.

At time t3, a portion of text, in this case the phrase "I look forward to meeting tou this afternoon" is converted to audio output. The controller determines if that text portion should be highlighted in the displayed text. It checks each word in the sentence against the words stored in a dictionary. Each word except "tou" is recognized. "tou" is a typographical error and is not in the dictionary. The controller therefore determines that the text portion "tou" should be highlighted, it delays until time t4, then controls the highlighting of the text portion "tou", At time t5 a portion of text, in this case the phrase "in London" is converted to audio output. The controller determines if that text portion should be highlighted in the displayed text. It checks each word in the sentence against the words stored in a dictionary. Each word is recognized and no highlighting is required.

At time t7, a portion of text, in this case the French phrase "a bientot," is converted to audio output. The controller determines if that text portion should be highlighted in the displayed text. It checks each word in the sentence against the words stored in a dictionary. "bientot" is not recognized in an English dictionary. The controller determines that the text portion "bientot" should be highlighted, it delays until time t8, then controls the highlighting of the text portion "bientot". By the time t8, the controller has un-highlighted "tou".

According to a third example, illustrated in FIG. 5, highlighting may be selectively applied to the displayed text. In this example, text is highlighted if it is a proper name. As each portion of the text is converted to audio output the controller determines if that text portion should be highlighted, if it should be highlighted, it delays, then controls the highlighting of the text portion. The controller identifies words which begin with a capital letter but which are not following a full-stop (period). The word "London" is produced as audio output at time t5 and is highlighted, after a delay, at time t6. By time t8 the highlighting has been removed.

According to a fourth example, illustrated in FIG. 6, highlighting may be selectively applied to the displayed text. In this example, text identified as problematic for the text-to-speech engine 16 is highlighted. As each portion of the text is converted to audio output the controller determines if that text portion should be highlighted, if it should be highlighted, it delays, then controls the highlighting of the text portion. In this example the word "email" is highlighted first. The estimated accuracy of the synthesis of "email" into speech at time t1 falls below a threshold and the controller, in response, controls the highlighting of the word, after a delay, at time t2. The highlighting of "email" has been removed by time t7, when the phrase "a bientot" is synthesized. The estimated accuracy of the synthesis of "bientot" into speech at time t7 falls below a threshold and the controller controls the highlighting of the word "bientot", after a delay, at time t8.

In the preceding examples illustrated in FIGS. 3 to 6, the same type of highlighting (underscoring) was used. Of course, the different examples illustrated in the Figures could each use a different type of highlighting. Furthermore, the controller could simultaneously perform any combination of the different examples on the same body of text.

Although a particular example of the present invention has been described in the preceding paragraphs, it should be appreciated that modifications and variations to the examples given can be made without departing from the scope of the invention as claimed.

What is claimed is:

1. An electronic device comprising:
a user interface including
a display for displaying text and
speech synthesizer means including a loudspeaker, which converts an input, dependent upon a text, to an audio output representative of a person reading the text; and
control means, for controlling the display and for providing an input to the speech synthesizer means, which controls the display of a text, to provide an input corresponding to the displayed text to the speech synthesizer, and to highlight a portion or portions of the displayed text, wherein initiation of the highlighting of a text portion is delayed by the control means until after the beginning of the audio output corresponding to the text portion.

2. A device as claimed in claim 1 wherein the control means synchronizes the highlighting with the conversion of text to audio output.

3. A device as claimed in claim 1, wherein the control means varies the highlighting with the conversion of text to audio output.

4. A device as claimed in claim 1, wherein the control means extends the highlighting through the displayed text with the conversion of text to audio output.

5. A device as claimed in claim 4 wherein the control means unselectively extends the highlighting through all of the text.

6. A device as claimed in claim 4, wherein the extending of highlighting through a text portion lags the conversion of the text portion to audio output by the delay.

7. A device as claimed in claim 4, wherein the highlighting extends discontinuously by portions of text corresponding to a word or words.

8. A device as claimed in claim 1, wherein the control means highlights a text portion for a limited duration.

9. A device as claimed in claim 8 wherein the highlighting isolates a portion or portions of text from a body of text, the initiation of the isolation of text lagging the conversion of the text to audio output by the delay and the isolation being maintained for the limited duration.

10. A device as claimed in claim 1, wherein the dimension of the highlighted portion is variable.

11. A device as claimed in claim 1, wherein the dimension of the highlighted portion is a constant number of words long.

12. A device as claimed in claim 1, wherein the display displays the full sentence of text being converted.

13. A device as claimed in claim 1, wherein the display displays the previous predetermined plurality of words that have been converted.

14. A device as claimed in claim 1, further comprising:
a dictionary, wherein the control means highlights words not in the dictionary.

15. A device as claimed in claim 14, wherein the control means provides different highlighting for the words not in the dictionary.

16. A device as claimed in claim 1, wherein the control means is arranged to identify proper nouns in the text, and highlight them.

17. A device as claimed in claim 16, wherein the control means provides different highlighting for the proper nouns in the text.

18. A device as claimed in claim 1, wherein the speech synthesizer means provides signals to the control means to effect the highlighting of specific words.

19. A device as claimed in claim 18 wherein the control means provides different highlighting to the specific words.

20. A device as claimed in claim 1, wherein highlighting may comprise anyone of:
contrast variation of the text and/or display background;
color variation of the text and/or display background;
reformatting of the text including underscoring, bold font, italic font, capitalization, changing font size or type; and
enclosing text in geometric shapes.

21. A device as claimed in claim 1, wherein the delay corresponds to a number of converted words or syllables.

22. A device as claimed in claim 1, wherein the delay corresponds to a fixed time.

23. A device as claimed in claim 1, wherein the delay is greater than 0.1 seconds.

24. A device as claimed in claim 1, wherein the delay is less than 3 seconds.

25. A device as claimed in claim 1, wherein the electronic device is a document reader or a hand-held communications device.

26. A hand-held radio communications device comprising:
a user interface including:
a display for displaying text and
speech synthesizer means including a loudspeaker, arranged to convert an input, dependent upon a text, to an audio output representative of a person reading the text; and control means for controlling the display and for providing an input to the speech synthesizer means, arranged to control the display of a text, to provide an input corresponding to the displayed text to the speech synthesizer, and to highlight a portion or portions of the displayed text, wherein initiation of the highlighting of a text portion is delayed by the control means until after the beginning of the audio output corresponding to the text portion.

27. A document reader comprising a user interface including:
a display for displaying text and
speech synthesizer means including a loudspeaker, arranged to convert an input, dependent upon a text, to an audio output representative of a person reading the text; and control means for controlling the display and for providing an input to the speech synthesizer means, arranged to control the display of a text, to provide an input corresponding to the displayed text to the speech synthesizer, and to highlight a portion or portions of the displayed text, wherein initiation of the highlighting of a text portion is delayed by the control means until after the beginning of the audio output corresponding to the text portion.

28. A car comprising:
a hand-held radio communications device which comprises:
a user interface which includes:
a display for displaying text, and
speech synthesizer means including a loudspeaker, arranged to convert an input, dependent upon a text, to an audio output representative of a person reading the text; and
control means for controlling the display and for providing an input to the speech synthesizer means, arranged to control the display of a text, to provide an input corresponding to the displayed text to the speech synthesizer, and to highlight a portion or portions of the displayed text, wherein initiation of the highlighting of a text portion is delayed by the control means until after the beginning of the audio output corresponding to the text portion, or
a document reader which comprises:
a user interface having:
a display for displaying text, and
speech synthesizer means including a loudspeaker, arranged to convert an input, dependent upon a text, to an audio output representative of a person reading the text; and control means for controlling the display and for providing an input to the speech synthesizer means, arranged to control the display of a text, to provide an input corresponding to the displayed text to the speech synthesizer, and to highlight a portion or portions of the displayed text, wherein initiation of the highlighting of a text portion is delayed by the control means until after the beginning of the audio output corresponding to the text portion;

wherein the display is-mounted for use by the driver.

29. A method for displaying text and providing speech synthesis of the text comprising the steps of:
displaying the text;
converting a text portion to audio output;
determining that the text portion should be highlighted;
delaying, until after the beginning of presentation of audio output, and then highlighting the text portion.

30. An electronic device comprising:
a user interface including:
a display for displaying text and
speech synthesizer means including a loudspeaker, arranged to convert an input, dependent upon a text, to an audio output representative of a person reading the text; and
control means, for controlling the display and for providing an input to the speech synthesizer means, arranged to control the display of a text, to provide an input corresponding to the displayed text to the speech synthesizer means, and to delay the initiation of the display of a text portion until after the beginning of the audio output corresponding to the text portion.

31. A method for displaying text and providing speech synthesis of the text comprising the steps of:
converting a text portion to audio output;
delaying, until after the beginning of presentation of audio output, and then displaying the text.

32. A device as claimed in claim 30, wherein the delay is greater than 0.1 seconds.

33. A method as claimed in claim 31, wherein the delay is greater than 0.1 seconds.

34. A device as claimed in claim 2, wherein the control means varies the highlighting with the conversion of text to audio output.

35. A device as claimed in claim 5, wherein the extending of highlighting through a text portion lags the conversion of the text portion to audio output by the delay.

36. A device as claimed in claim 5, wherein the highlighting extends discontinuously by portions of text corresponding to a word or words.

37. A device as claimed in claim 6, wherein the highlighting extends discontinuously by portions of text corresponding to a word or words.

38. A device as claimed in claim 35, wherein the highlighting extends discontinuously by portions of text corresponding to a word or words.

39. A computer program executable in a processor of an electronic device having a display and speech synthesizer means including a loudspeaker, the computer program comprising a computer program code configuring the processor to provide control means, for controlling the display and for providing an input to the speech synthesizer means, which controls the display of a text, to provide an input corresponding to the displayed text to the speech synthesizer, and to highlight a portion or portions of the displayed text, wherein initiation of the highlighting of a text portion is delayed by the control means until after the beginning of the audio output corresponding to the text portion.

* * * * *